(12) United States Patent
Dotsubo et al.

(10) Patent No.: US 6,556,243 B1
(45) Date of Patent: Apr. 29, 2003

(54) DIGITAL CAMERA

(75) Inventors: Nobuhide Dotsubo, Daito (JP); Masao Tamashima, Sakai (JP); Toshinobu Haruki, Kyotanabe (JP); Toshiyuki Toyofuku, Hachioji (JP); Yawara Saito, Oume (JP)

(73) Assignees: Sanyo Electric, Co., Ltd., Moriguchi (JP); Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/096,385

(22) Filed: Jun. 12, 1998

(30) Foreign Application Priority Data

Jun. 13, 1997 (JP) ................................................ 9-157162

(51) Int. Cl.[7] .......................... H04N 5/76; H04N 5/262; H04N 5/222
(52) U.S. Cl. ............................. 348/231.2; 348/231.3; 348/239; 348/333.12
(58) Field of Search .............................. 348/231, 232, 348/233, 239, 333.02, 333.05, 333.12, 218, 36, 231.99, 231.2, 231.3, 231.6, 218.1; 382/299, 301

(56) References Cited

U.S. PATENT DOCUMENTS

| | | | | |
|---|---|---|---|---|
| 5,239,625 A | * | 8/1993 | Bogart et al. ................ | 345/428 |
| 5,418,565 A | * | 5/1995 | Smith ........................ | 348/233 |
| 5,477,264 A | * | 12/1995 | Sarbadhikari et al. ...... | 348/231 |
| 5,633,678 A | * | 5/1997 | Parulski et al. ............. | 348/232 |
| 5,742,339 A | * | 4/1998 | Wakui ........................ | 348/233 |
| 5,805,237 A | * | 9/1998 | Nakatani et al. ............ | 348/239 |
| 5,875,034 A | * | 2/1999 | Shintani et al. ............. | 348/233 |
| 5,907,704 A | * | 5/1999 | Gudmundson et al. ..... | 717/100 |
| 5,914,748 A | * | 6/1999 | Parulski et al. ............. | 348/239 |
| 6,014,170 A | * | 1/2000 | Pont et al. ................ | 348/231.4 |
| 6,151,421 A | * | 11/2000 | Yamada ..................... | 382/284 |
| 6,181,379 B1 | * | 1/2001 | Kingetsu et al. ............ | 348/239 |
| 6,192,191 B1 | * | 2/2001 | Suga et al. .................. | 348/231 |
| 6,278,486 B1 | * | 8/2001 | Hieda et al. ................ | 348/239 |
| 6,483,540 B1 | * | 11/2002 | Akasawa et al. ........... | 348/239 |

FOREIGN PATENT DOCUMENTS

JP 61072344 A * 4/1986 ........... G06F/12/00

* cited by examiner

Primary Examiner—Wendy R. Garber
Assistant Examiner—John M. Villecco
(74) Attorney, Agent, or Firm—Armstrong, Westerman & Hattori, LLP

(57) ABSTRACT

A digital camera includes a memory card. Title image data and photograph image data are compressed according to a JPEG format so that compressed data thereof are recorded in the same memory card. When the title image data and the photograph image data are combined into composite image data, the composite image data is also compressed according to the JPEG format and recorded into the same memory card. That is, the title image data, the photograph image data and the composite image data are compressed according to the same format, and their compressed data are recorded in the same memory card.

1 Claim, 20 Drawing Sheets

FIG. 2

| MARKER | EXPLANATION |
|---|---|
| SOI (START OF IMAGE) | START MARKER FOR IMAGE FILE |
| APP0 | START MARKER FOR THUMBNAIL IMAGE AREA |
| APP12 | START MARKER FOR IMAGE INFORMATION AREA |
| DQT (DEFINE QUANTIZATION TABLE) | START MARKER FOR QUANTIZATION TABLE DATA AREA |
| SOF (START OF FRAME) | START MARKER FOR FRAME-RELATED PARAMETER AREA FRAME |
| DHT (DEFINE HUFFMAN TABLE) | START MARKER FOR HUFFMAN ENCODING TABLE DATA AREA |
| SOS (START OF SCAN) | START MARKER FOR COMPONENT-RELATED PARAMETER AREA |
| NO MARKER | COMPRESSED IMAGE DATA AREA |
| EIO (END OF IMAGE) | END MARKER FOR IMAGE FILE |

(A)
FIG. 5
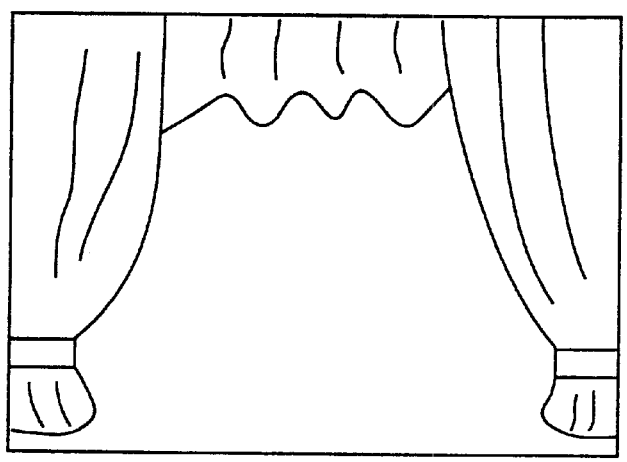
(B)
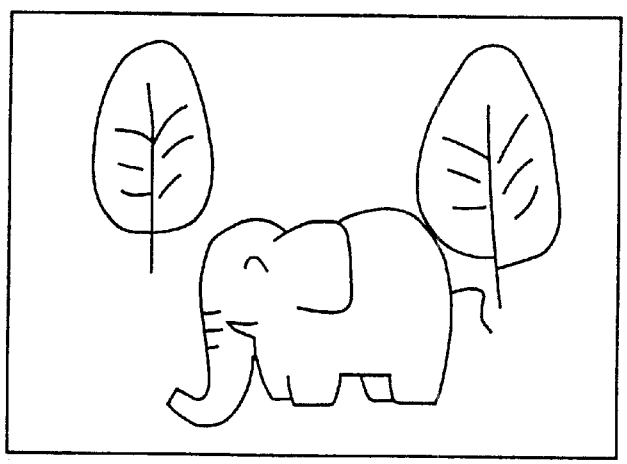
(C)
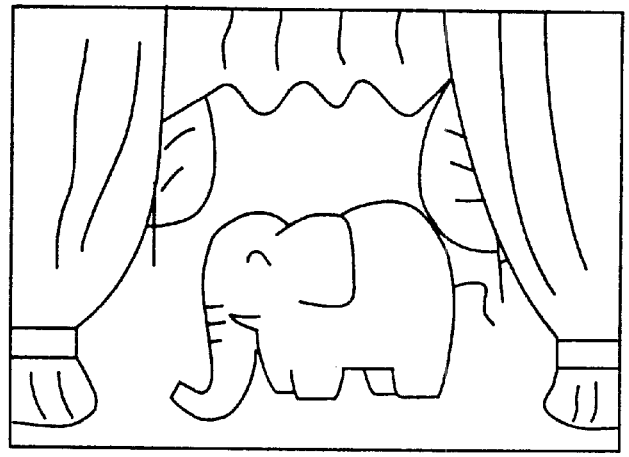

FIG. 6
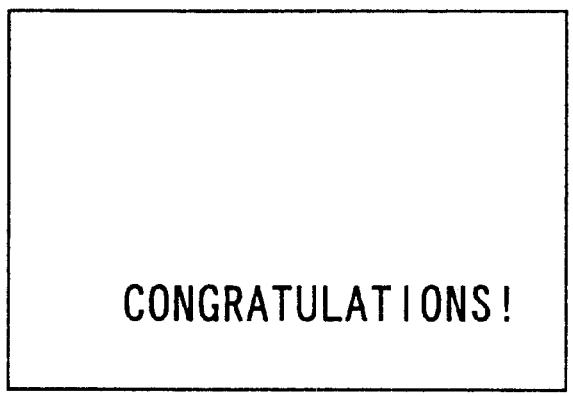
(B)
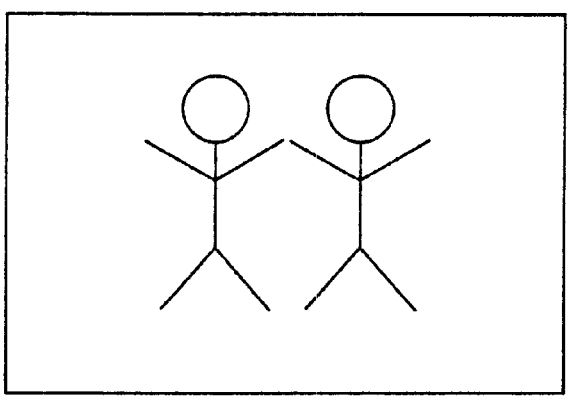
(C)
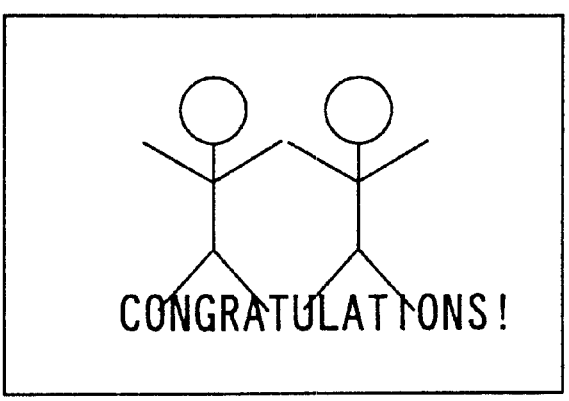

FIG. 19

(A) MEMORY CARD syn00001.jpg
pic00001.jpg
syn00004.jpg
pic00005.jpg
pic00002.jpg
syn00003.jpg (B) ENTRY TABLE NO.1 syn00001.jpg
NO.2 AND SUBSEQ. NO ENTRY (E) ENTRY TABLE NO.1 syn00001.jpg
NO.2 syn00004.jpg
NO.3 pic00001.jpg
NO.4 pic00005.jpg
NO.5 AND SUBSEQ. NO ENTRY (C) ENTRY TABLE NO.1 syn00001.jpg
NO.2 pic00001.jpg
NO.3 AND SUBSEQ. NO ENTRY (F) ENTRY TABLE NO.1 syn00001.jpg
NO.2 syn00004.jpg
NO.3 pic00001.jpg
NO.4 pic00002.jpg
NO.5 pic00005.jpg
NO.6 AND SUBSEQ. NO ENTRY (D) ENTRY TABLE NO.1 syn00001.jpg
NO.2 syn00004.jpg
NO.3 pic00001.jpg
NO.4 AND SUBSEQ. NO ENTRY (G) ENTRY TABLE NO.1 syn00001.jpg
NO.2 syn00003.jpg
NO.3 syn00004.jpg
NO.4 pic00001.jpg
NO.5 pic00002.jpg
NO.6 pic00005.jpg
NO.7 AND SUBSEQ. NO ENTRY

DIGITAL CAMERA

BACKGROUND OF THE INVENTION

Field of the Invention

This invention relates to digital cameras, and more particularly to a digital camera which is adapted particularly to record, for example, image data into a memory card.

DESCRIPTION OF THE PRIOR ART

There is a disclosure as one example of a conventional digital camera of this kind in Japanese Laying-Open Patent Publication No. H9-27940 [H04N 5/91, 5/278, 5/765, 5/781, 5/907] laid open to the public on Jan. 28, 1997. This prior art is intended to composite title image data previously recorded in a title memory card with newly-photographed image data so that the image data thus composited is recorded in a photograph-image memory card.

In such a prior art, however, the title image data is recorded in an exclusive memory card, while the composite image data is recorded to a separate memory card. Therefore, there is inconvenience in controlling or handle the image data.

SUMMARY OF THE INVENTION

Therefore, it is the object of this invention to provide a digital camera with which the image data is easy to control or handle.

This invention is a digital camera, comprising: a recording medium for holding special image data; a photograph designating means for designating a photographing; a photographing means for photographing a subject in response to an output of the photograph designating means; a photograph image recording means for recording photograph image data outputted from the photographing means into the recording medium; a compositing designating means for designating to composite the special image data with the photograph image data; a compositing means for compositing the special image data with the photograph image data in response to an output of the compositing designating means; and a composite image recording means for recording composite image data composited by the compositing means into the recording medium.

If a photographing of a subject is designated, a photograph image data is outputted from the photographing means. This photograph image data is recorded into the recording medium by the photograph image recording means. The recording medium is stored also with special image data. If a designation of image compositing is given, the compositing means composites the special image data with the photograph image data.

In one aspect of this invention, the special image data has a first resolution, and the photograph image data having at least one of the first resolution and a second resolution. The compositing means brings the photograph image data and the special image data into coincidence in resolution with each other depending upon a resolution of the photograph image data, and composites these image data after completing the adjustment.

In one embodiment of this invention, the special image data has a first file name including a first discriminator. The photographed image recording means adds a second file name including a second discriminator to the photographed image data, while the composite image recording means adds another second file name including the second discriminator to the composite image data. Incidentally, the special image data is, for example, template image data.

In another aspect of this invention, when a reproduction is designated, the reading means reads the first file name and the second file name out of the recording medium. A classifying means classifys a file name read out by the reading means according to a discriminator affixed to the file name. With referrence to a result of classification thus obtained, the reproducing means reproduces predetermined image data on a display.

This invention is a digital camera arranged to record image data into a recording medium, comprising: a photographing means for photographing a subject and outputting photograph image data; a normal photograph designating means for designating a normal photographing; a special photograph designating means for designating a special photographing; a photograph image recording means for recording the photograph image data into the recording medium in response to a designation of the normal photographing; a creating means for creating special image data from the photograph image data in response to a designation of the special photograph; a special image recording means for recording the special image data into the recording medium; a compositing designating means for designating a compositing of the special image data with the photograph image data; a compositing means for compositing the special image data with the photograph image data in response to an output of the compositing designating means; and a composite image recording means for recording composite image data composited by the compositing means into the recording medium.

If a normal photographing is designated, the photograph image recording means records the photograph image data outputted from the photographing means into the recording medium. On the other hand, if a special photographing is designated, the creating means first creates special image data from the photograph image data, and the special image recording means records the special image data into the recording medium. If a compositing designation is given, the compositing means composites the special image data with the photograph image data, and the composite image recording means records the composite image data into the recording medium.

In one aspect of this invention, the photographing means performs a photographing at any one of a first resolution and a second resolution in response to a designation of the normal photographing, and a photographing at the first resolution in response to a designation of the special photographing. The compositing means brings the photograph image data and the special image data into coincidence in resolution with each other depending upon a resolution of the photograph image data.

In one embodiment of this invention, the creating means binarizes the photograph image data, and removes a predetermined frequency component of the binarized data. As a result, special image data is created. The creating means also adds protecting information to the special image data. This prevents the special image data from being unintentionally deleted. Incidentally, the special image data is title image data.

According to this invention, since the special image data and the photograph image data are recorded in a same recording medium, it is possible to easily control or manage the image data.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing image file forms;

FIG. 5(A) is an illustrative view showing a template image, FIG. 5(B) is an illustrative view showing a photographing image, and FIG. 5(C) is an illustrative view showing a composite image;

FIG. 6(A) is an illustrative view showing a title image, FIG. 6(B) is an illustrative view showing a photographed image and FIG. 6(C) is an illustrative view showing a composite image;

FIG. 19 is an illustrative view showing one part of operations in the FIG. 18 embodiment;

DETAILED DESCRIPTION OF THE PREFERRED EMBODIMENT

Figure 1:
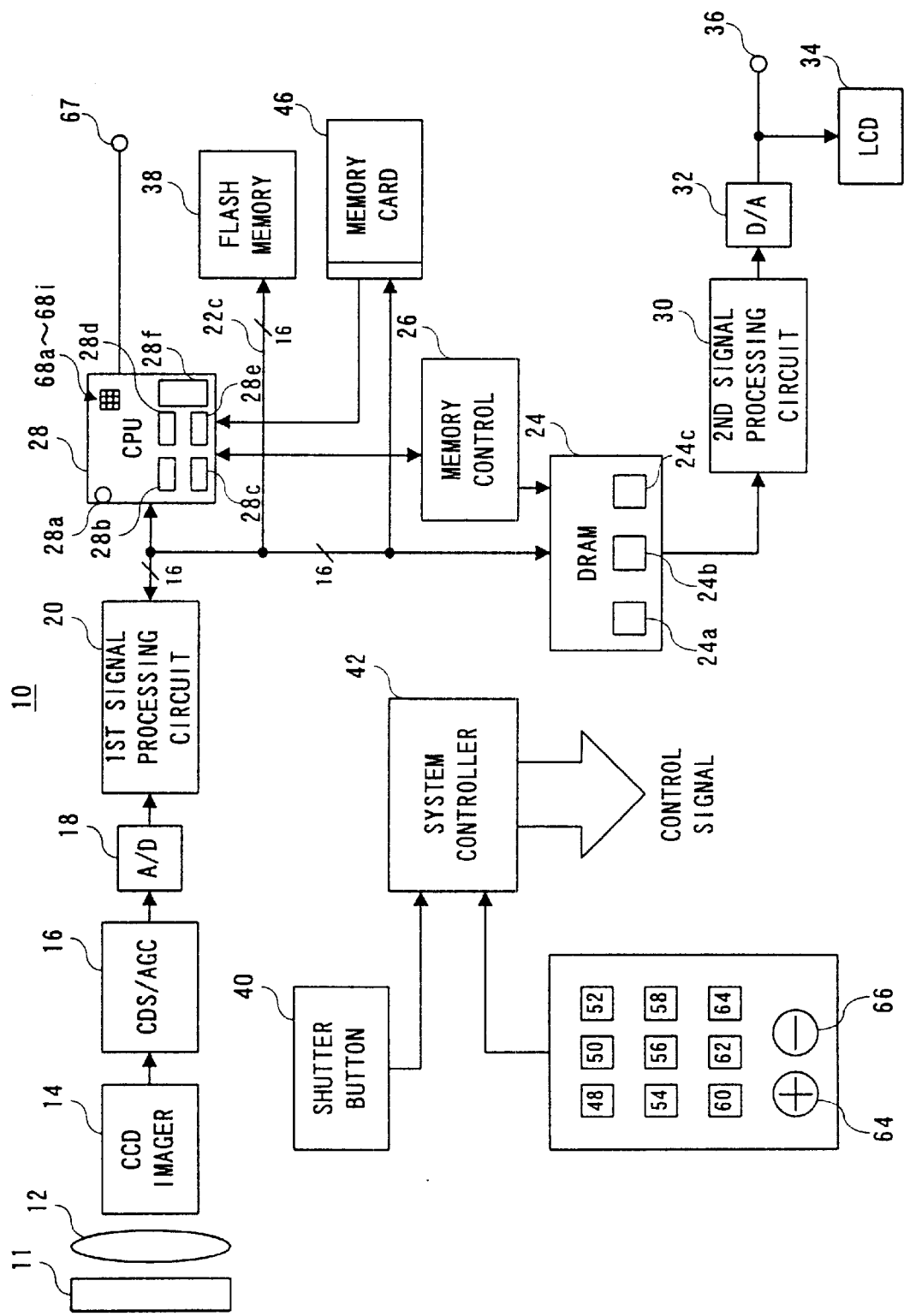
FIG. 1 is a block diagram showing one embodiment of this invention.

Referring to FIG. 1, a digital camera 10 of this embodiment includes a barrier 11 formed at a front of a main body thereof. If this barrier 11 is opened, a photograph mode is set. Accordingly, an optical image incident upon a lens 12 is given to a CCD imager 14 through a color filter having $C_y$, $Y_e$, $M_g$ and G arranged in a mosaic form.

When outputting a motion picture through a monitor 34, the CCD imager 14 performs so-called well-known pixel mixing readout to supply a resulting pixel signal to a CDS/AGC circuit 16. The CDS/AGC circuit 16 performs well-known noise removal and level adjustment on the inputted pixel signal. The pixel signal processed by this CDS/AGC circuit 16 is then converted by an A/D converter 18 into digital data, i.e. pixel data. A first signal processing circuit 20 receives the pixel data outputted from the A/D converter 18 to calculate luminance data (Y data) and color-difference data (U data and V data). Upon creating Y data, the inputted pixel data is averaged according to Equation 1.

For a line $(H1 + H2)$                            [Equation 1]

$$Y = \{(Mg + Ye) + (G + Cy)\}/2$$
$$= \{(R + B + R + G) + (G + B + G)\}/2$$
$$= (2R + 3G + 2B)/2$$

For a line $(H3 + H4)$ $$Y = \{(G + Ye) + (Mg + Cy)\}/2$$
$$= \{(G + G + R) + (R + B + B + G)\}/2$$
$$= (2R + 3G + 2B)/2$$

where, Mg=R+B, Ye=R+G, and Cy=B+G

Since the Y data is proportional to 2R+3G+2B, the component B is reproduced brighter than the y data (=0.3R+ 0.59G+0.11B) specified by the NTSC standard. This, however, raises no practical problem.

Meanwhile, when creating U data and V data, the first signal processing circuit 20 performs subtraction between adjacent pixels according to Equation 2.

For a line $(H1 + H2)$                            [Equation 2]

$$U = \{(Mg + Ye) - (G + Cy)\}$$
$$= \{(R + B + R + G) - (G + B + G)\}$$
$$= 2R - G$$

For a line $(H3 + H4)$ $$V = \{(G + Ye) - (Mg + Cy)\}$$
$$= \{(G + G + R) + (R + B + B + G)\}$$
$$= G - 2B$$

where, Mg=R+B, Ye=R+G, and Cy=B+G

However, the color-difference data is available only every other line. Accordingly, the first signal processing circuit 20 supplements for deficient color-difference data on a current line by using the color difference data on the preceding line. That is, V data only is available on a line (H3+H4) so that the U data on a line (H1+H2) is utilized for the U data for the line (H3+H4).

The Y, U and V data thus created are written by a memory control circuit 26 into a memory area 24a of a DRAM 24 through an internal bus 22, and are thereafter outputted to a second signal processing circuit 30. The second signal processing circuit 30, when outputting a motion picture, performs predetermined horizontal and vertical interpolations on the Y, U and V data (motion picture data) from the DRAM 24 so that these data become suited for a display-screen size of an LCD 34. The motion picture data, supplied from the second signal processing circuit 30, is converted by a D/A converter 32 into an analog signal. This analog signal is supplied to the LCD 34, and also outputted through an output terminal 36. Accordingly, a motion picture is outputted through the LCD 34 with improved image quality.

When an operator depresses the shutter button 40, a system controller 42 controls the CCD imager 14 so as to perform so-called all-pixel readout. Due to this, the CCD imager 14 outputs pixel signals on every other line. Since the CCD imager 14 is mounted with a color filter in a mosaic form, $C_y$ and $Y_e$ are alternately outputted at an odd line, while $M_g$ and G are alternately outputted at an even line. The CDS/AGC circuit 16 performs noise removal and level adjustment on the pixel signal, similarly to the above. The A/D converter 18 converts the pixel signal from the CDS/AGC circuit 16 into digital data, i.e. pixel data. The CCD imager 14 is disabled after outputting 1 frame of pixel signals. The 1-frame pixel data created by the A/D converter 18 is directly delivered onto a bus 22 without being processed by the first signal processing circuit 20. The pixel data is written into the memory area 24a by the memory control circuit 26.

The CPU 28 performs YUV-conversion on the pixel data in the memory area 24a according to Equation 3 to Equation 5 by using a working area 24c, and compresses the converted Y, U and V data, i.e. photographed image data, according to a JPEG format to thereby create an image file containing pressed data (compressed image data).

[Equation 3]

$$Y_h = C_y + Y_e + M_g + G$$

$$C_b = (C_y + M_g) - (Y_e + G)$$

$$C_r = (Y_e + M_g) - (C_y + G)$$

[Equation 4]

$$R = k_{11} \times Y_h + k_{12} \times C_b + k_{13} \times C_r$$

$$G = k_{21} \times Y_h + k_{22} \times C_b + k_{23} \times C_r$$

$$B = k_{31} \times Y_h + k_{32} \times C_b + k_{33} \times C_r$$

The R, G and B data obtained through color separation are converted into Y (=$Y_L$), U and V data, according to Equation 3. Note that, since color-difference signals $C_b$ and $C_r$, upon being calculated by Equation 1, alternately occur on every other line, so that a lacked color-difference signal is practically supplemented by the use of a 1-H delay line (not shown).

[Equation 5]

$$Y_L = 0.299 \times R + 0.587 \times G + 0.114 \times B$$

$$U = B - Y_L$$

$$V = R - Y_L$$

The image file is recorded in a memory card 46. Note that, during the color separation and YUV conversion as stated above, adjacent 4 (2×2) pixels of $C_y$, $M_g$, $Y_e$. and G data are used to create 1-pixel Y, U and V data of the 4 pixels, thereby providing Y, U and V data for all the pixels. The memory control circuit 26 reads $Y_e$, $C_y$, $M_g$ and G pixel data on a line-by-line basis out of the memory area 24a, and supplies them to the second signal processing circuit 30. The second signal processing circuit 30, when depressing the shutter button 40, performs color separation and YUV-conversion on the pixel data according to Equation 3 to Equation 5, thereby outputting a photographed image (freeze image) on the LCD 34.

The image files, recorded in the memory card 46, each have a marker affixed to a predetermined address thereof as shown in FIG. 2. Among them, "SOI" is a start marker of an image file. Markers "APP0" and "APP12" respectively are start markers of a thumbnail image data area and an image information area, which are originally contemplated by the present applicant. "DQT" is a start marker of a quantization-table data area, "SOF" is a start marker of a parameter area concerned with frames, and "DHT" is a start marker of a Huffman encoding-table data area. "SOS" is a start marker of a parameter area concerned with components, and "EOI" is an end marker of an image file. Note that a compressed image data area is provided subsequent to the parameter area concerning components.

The frame-parameter area is written with the number of pixels of image data. If the number of pixels is 640 pixels× 400 lines, the resolution of a recorded image is VGA. If the number of pixels is 1024 pixels×768 lines, the resolution of a recorded image is XGA. The image information area is written with date and hour of photographing, photographing conditions such as on/off of a not-shown strove, presence or absence of protection setting, etc.

Figure 3:
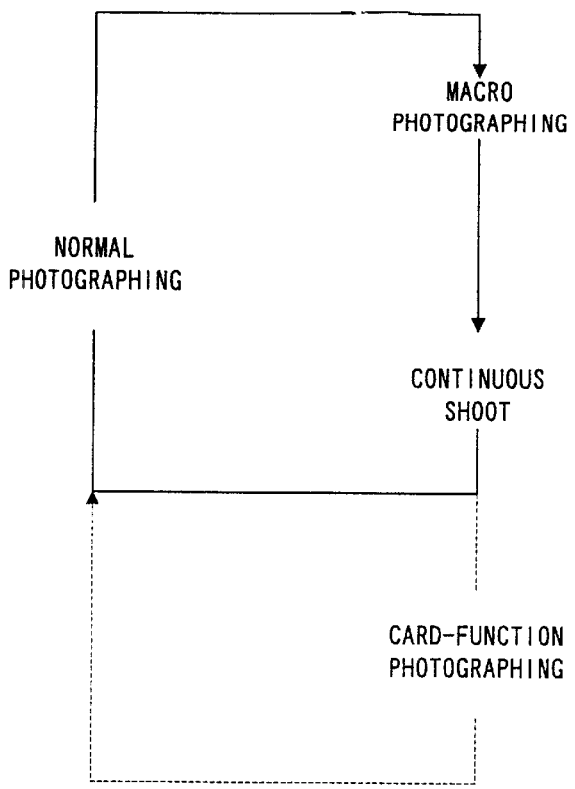
FIG. 3 is an illustrative view showing a photographing mode.
Figure 4:
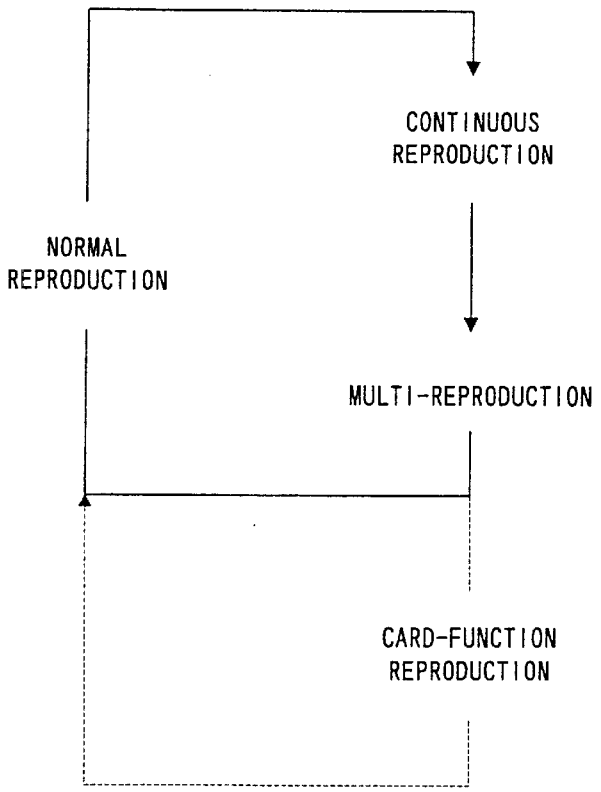
FIG. 4 is an illustrative view showing a reproducing mode.
Figure 7:
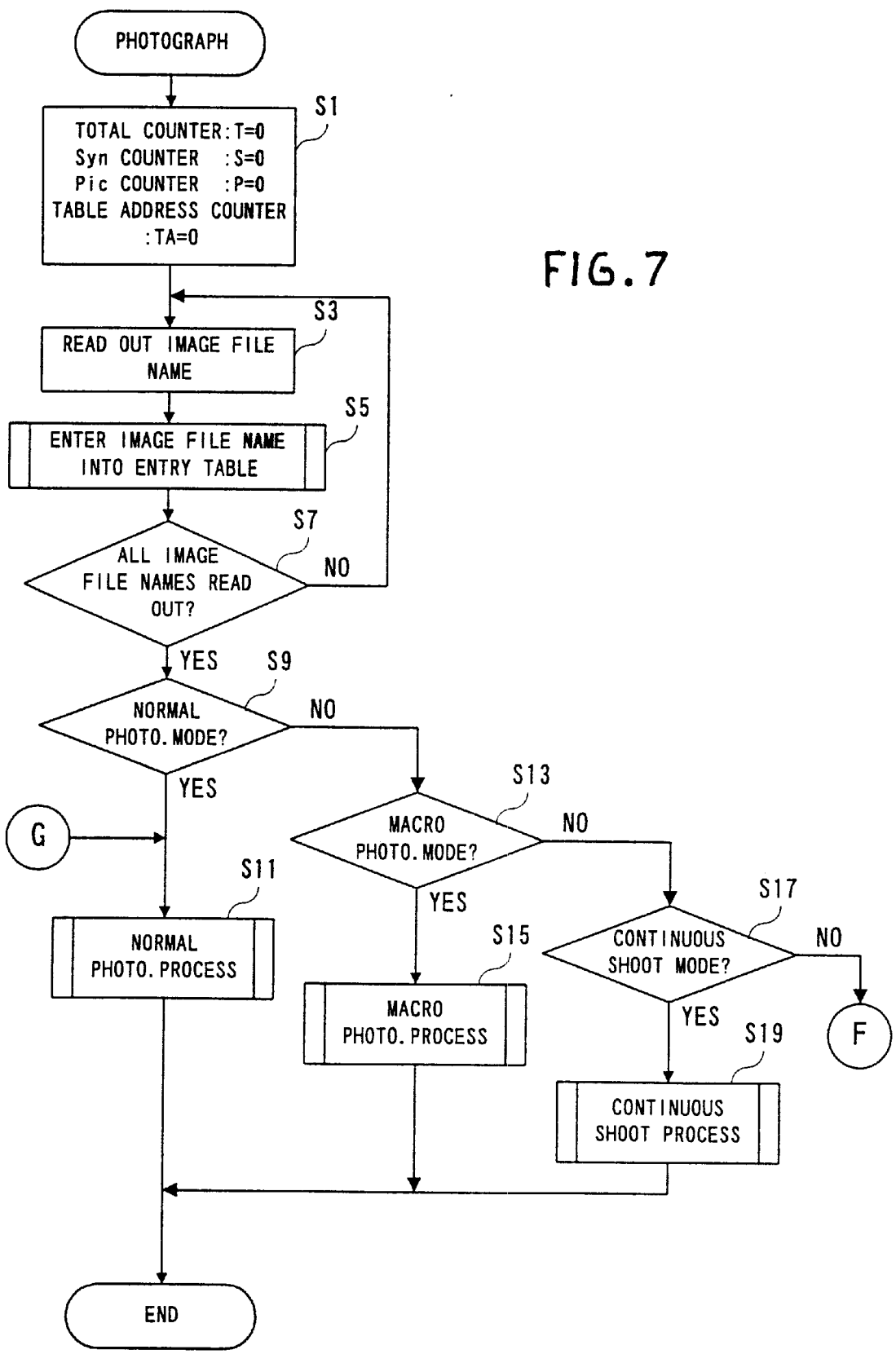
FIG. 7 is a flowchart showing one part of operations in the photographing mode in FIG. 1 embodiment.

Incidentally, in the photograph mode, it is possible to set in any of a normal photograph mode, a macro (close-up) photograph mode, a continuous shoot mode and a card-function photograph mode by operating a photograph-mode changeover button 48 by the operator, as shown in FIG. 3. However, if a memory card attached to the slot 44 is not a specified card, the card-function photograph mode is impossible to set, making it impossible to create a title image file to be explained later. In the digital camera 10 of this embodiment, the operator can set the resolution at XGA or VGA in any of the photograph modes. The CCD imager 14 creates a pixel signal such that the photographed-image data has a desired resolution.

If the barrier 11 is closed, a reproducing mode is set. Thereupon, the CPU 28 reads compressed data out of a desired image file recorded in the memory card 46, and expands the compressed data by using the working area 24c. The expanded photographed-image data (YUV data) are stored in the memory area 24a, and thereafter read out. The second signal processing circuit 30 performs horizontal and vertical interpolations on the Y, U and V data, thereby displaying a quality-improved reproduced image on the LCD 34.

In the reproducing mode, the operator can manipulate a reproducing-mode changeover button 52 to thereby set in any of a normal reproducing mode, a continuous reproducing mode, a multi-reproducing mode and a card-function reproducing mode. However, if the memory card 46 is not a specified card, the card-function photograph mode is impossible to set.

If a template card is used as a memory card 46 that is previously prepared with a template image as shown in FIG. 5(A) and written with a template code, the operator can set the card-function reproducing mode. In this card-function reproducing mode, if the operator operates a+button 464, a –button 66 and a selecting button 58, a synthetic image as shown in FIG. 5(C) can be created which is composited by a template image as in FIG. 5(A) with a photographed image as in FIG. 5(B).

Also, if a binary card written with a binary code is used as a memory card 26, a synthetic image is created as shown in FIG. 6(C) that is composited of a title image as shown in FIG. 6(A) with an photographed image as shown in FIG. 6(B). The title image data shown in FIG. 6(A) can be created by setting a "title image" through the use of an image setting button during photographing by the operator and photographing a character-depicted subject as shown in FIG. 6(A).

Incidentally, the template image data and the title image data are accommodated within an image file having a file name "syn0000S.jpg" (S is an integer), while the photographed image data and the synthetic image data are held in an image file having a file name "pic0000P.jpg" (P is an integer). Also, the title image and the template image are set in resolution at VGA. This makes it possible to use a binary card and a template card in any of a model with a resolution of XGA (1024 pixels×708 lines) and VGA (640 pixels×480 lines) and a model with a resolution of VGA and QVGA (320 pixels×240 lines). That is, if the resolution is set at VGA having an intermediate value for a title image and a template image, the interpolation or thinning-out performed only on the title image and the template image provides an after-processing resolution in conformity to the resolution of the photographed image. In other words, it is possible to combine a title image or template image with a photographed image without requiring interpolation or thinning-out for the photographed image obtained through normal photographing.

Incidentally, if this digital camera 10 is a model having resolutions of XGA and VGA, the resolution of XGA or VGA is possible to set by operating an image-quality setting button 63. If this digital camera 10 is a model having resolutions of VGA and QVGA, the resolutions of VGA or QVGA is possible to set by operating the image-qulaity setting button 63.

When the operator operates a download button 62, the CPU reads out a photographed-image file recorded in the memory card 46 to output it to a personal computer (not shown) through an output terminal 67 without performing a JPEG expansion.

A flash memory 38 is stored with programs corresponding to the flowcharts shown in FIG. 7 to FIG. 16. A CPU 28, in the photograph mode, processes on the flowcharts in FIG. 7, FIG. 8, FIG. 16, FIG. 19 and FIG. 20. The CPU 28, in the reproducing mode, processes on the flowcharts of FIG. 9 to FIG. 14 and FIG. 16, while it processes on the flowchart of FIG. 15 during downloading.

In the photograph mode, the CPU 28 resets, at a step S1, a count value T of a total counter 28b, a count value S of a syn counter 28c, a count value P of a pic counter 28d and a count value TA of a table-address counter 28e. The CPU 28 then read out, at a step S3, image file names from a top in order out of the memory card 46, and enter the read image file names to an entry table 28f at a step S5. It is determined at a step S7 whether all the image files have been read out. If "NO", the process returns to the step S3 to repeat the above-stated operation, while if "YES", it is considered that all the image file name have been registered to the entry table 28f, and the process proceeds to a step S9.

Figure 18:
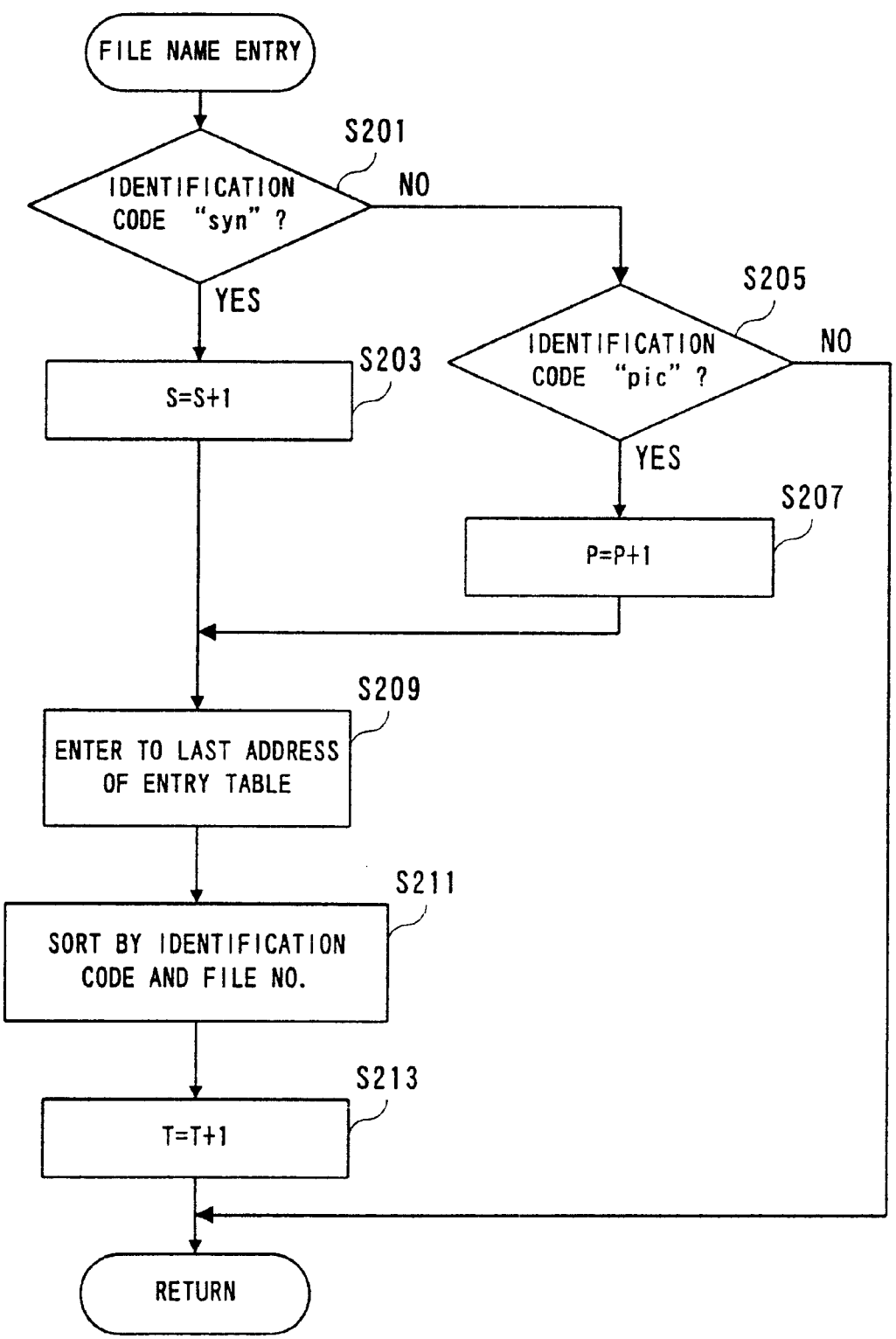
FIG. 18 is a flowchart showing one part of operations in the photographing mode and the reproducing mode in the FIG. 1 embodiment.

At the step S5, a subroutine shown in FIG. 18 is processed. That is, the CPU 28 determines, at a step S201, whether an identification code contained in the read image file name is "syn" or not. If "YES", the syn counter 28c is incremented, and the process proceeds to a step S209. Meanwhile, if "NO" at the step S201, it is determined at a step S205 whether the identification code is "pic" or not. If "NO", the process goes to return. However, if "YES", the pic counter 28d is incremented at a step S207, and the process proceeds to the step S209. The CPU 28 enters, at the step S209, this image file name to a last address of the entry table 28f, and sorts the image file names registered in the entry table 28f according to the identification code and file number. That is, at a step S211 the CPU 28 places image files according to a file number order such that an "syn" image file is placed higher than a "pic" image file. The CPU 28 then increments the total counter 28b at a step S213, and then the process returns.

Due to the processing of the subroutine as this, where image files are recorded in the memory card 46 as shown in FIG. 19(A), the subroutine processing at a first cycle causes "syn00001.jpg" to be first entered to No. 1 (count value TA=1) in the entry table 28f. The subroutine process at a second cycle reads an image file name "pic00001.jpg", out of the memory card. Since this image file name has an identification code "pic" "pic00001.jpg" is entered subsequent to "syn00001.jpg" as shown in FIG. 19(C). Since an image file name read out at a third cycle has an identification code "syn" and a file number "00004", "pic00001.jpg" is shifted to No. 3 to enter "syn00004.jpg" at No. 2 as shown in FIG. 19(D). In this manner, all the image file names are finally entered to the entry table 28f as shown in FIG. 19(G). That is, the image file names with the identification code "syn" are registered at No. 1–No. 3 according to their file Nos., while the image file names with the identification code "pic" are entered to No. 4–No. 6 according to their file Nos. Accordingly, the title image data is prior to the photographed image data during reproduction.

The CPU 28 determines a current photograph mode at steps S9, S13 and S17. If "YES" at the step S9, the mode setting is determined as a normal photograph mode to perform a normal photograph process at a step S11, ending the process. If "YES" at a step S13, the mode setting is a macro photograph mode to perform a macro photograph process at a step S15, ending the process. If "YES" at a step S17, the mode setting is determined as a continuous-shoot mode to perform a continuous-shoot process at a step S19, ending the process. If "NO" at a step S17, the mode setting is determined as a card-function photograph mode and the process proceeds to a step S21. Incidentally, in the continuous-shoot mode, four size-reduced image data having a determined time difference are created to display four size-reduced images on the LCD 34. Also, in the macro photograph mode, signal processing is carried out appropriately for close-up photographing.

Figure 8:
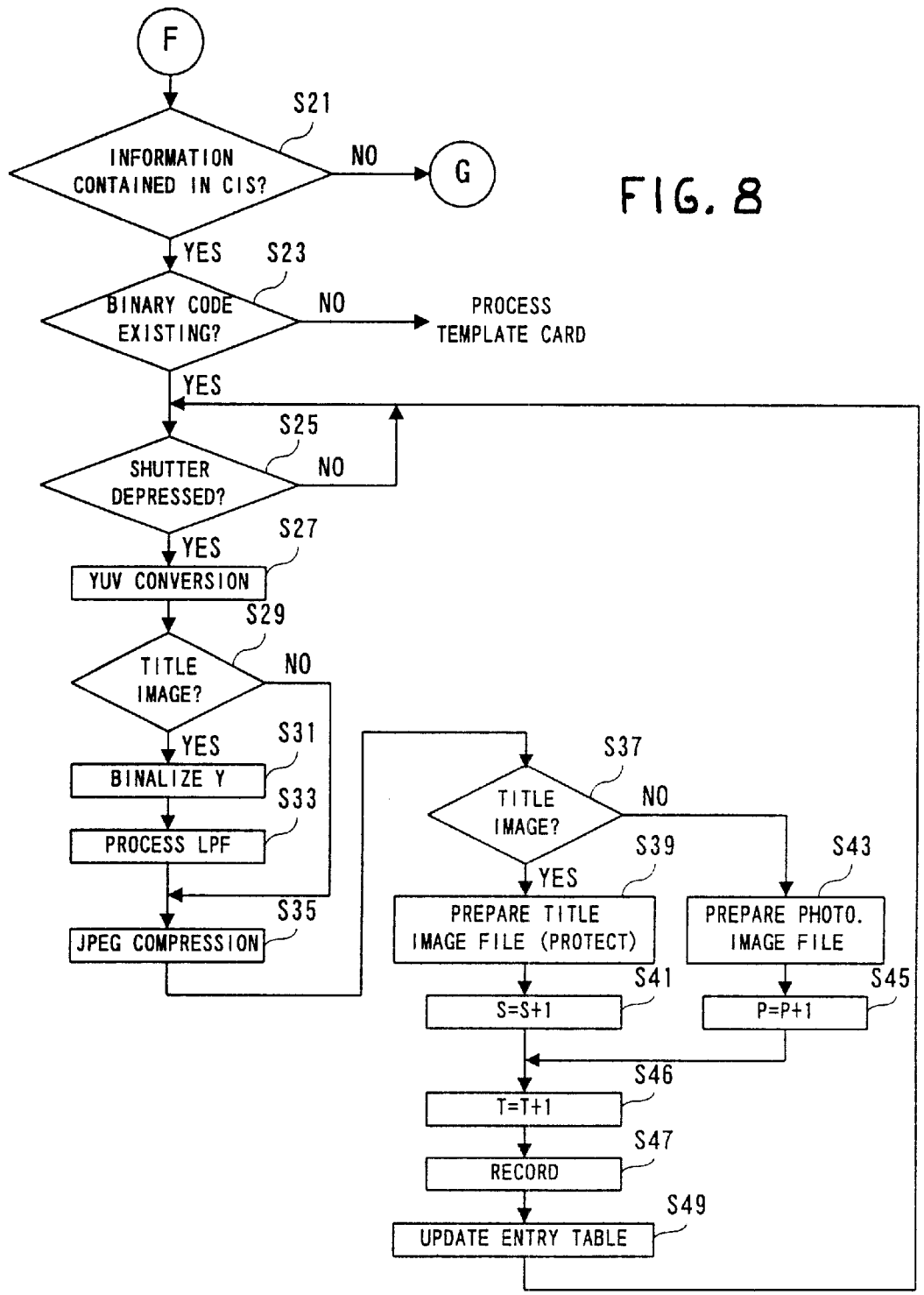
FIG. 8 is a flowchart showing another part of operations in the photographing mode in the FIG. 1 embodiment.

At a step S21 in FIG. 8, the CPU 28 determines whether or not any of information is written in an item-name information area formed in CIS (Card Information Structure) of the memory card 46. If "NO", the memory card 46 is determined as not a specified card and the process returns to the step S11. That is, the normal photograph mode is set. On the other hand, if "YES" at the step S21, the CPU determines at a step S23 whether the same information is a binary code or not. If "NO", the memory card 46 is considered as a template card and the process is shifted to another process. If "YES", the memory card 46 is considered as a binary card. After waiting a determination at a step S25 that the shutter button 40 is depressed, the photographed image data is YUV-converted at a step S27.

The CPU 28 subsequently makes reference to the setting of the image setting button 50 at a step S29 to determine whether this photographed image is a title image or not. If "NO", the process advances directly to a step S35. However, if "YES", the Y data is binarized at a step S31 so that the binary data is subjected to an LPF (Low Pass Filter) process at a step S33. Then the process proceeds to a step S35. The reason of subjecting the title image data to the LPF processing is to prevent ringing from occurring at a region closed to a boundary line between the photographed image and the title image during compositing these images. Incidentally, if a "title image" has been set by the image setting button 50, the resolution is set at VGA regardless of the setting of the image-quality setting button 63.

At a step S35, the CPU 28 compresses the photographed image data according to a JPEG format, and then determines again at a step S37 that this photographed image is a title image or not. If "YES", the CPU 28 creates, at a step S39, an image file having a file name "syn0000S+1.jpg" and makes protection on this image file, to increment the syn counter 28c at a step S41. On the other hand, if "NO" at the step S37, the CPU 28 creates, at a step S43, an image file having a file name "pic0000P+1.jpg" to increment the pic counter 28d at a step S45. The CPU 28 subsequently increments, at a step S46, the total counter 28b, records the created image file in the memory card 46 at a step S47, and update the entry table 28f at a step S49. Then the process returns to the step S25. In this manner, the title image files and the photographed image files are recorded in the memory card 46 in a mixed manner.

Incidentally, the created image files are entered to a directry entry according to a MS-DOS file format. Where setting a protection, the information on the presence of protection is written into the image information area shown in FIG. 2. At the same time, checking is made as to a readout-exclusive file item of the file properties specified by the MS-DOS file format. Also, at a step S49 a subroutine shown in FIG. 18 is processed.

At the step S23, if the determination is "NO", the process for the template card is carried out. However, this process is almost similar to the process for the binary card, thus omitting duplicated explanations. A difference lies in that the steps S29–S33 and the steps S37–S41 are omitted. Since the template card must not be recorded with a title image, the steps related to the processing for a title image are omitted. As a result, if the determination at the step S23 is "NO", the process becomes similar to the normal photograph process of the step S11.

Figure 9:
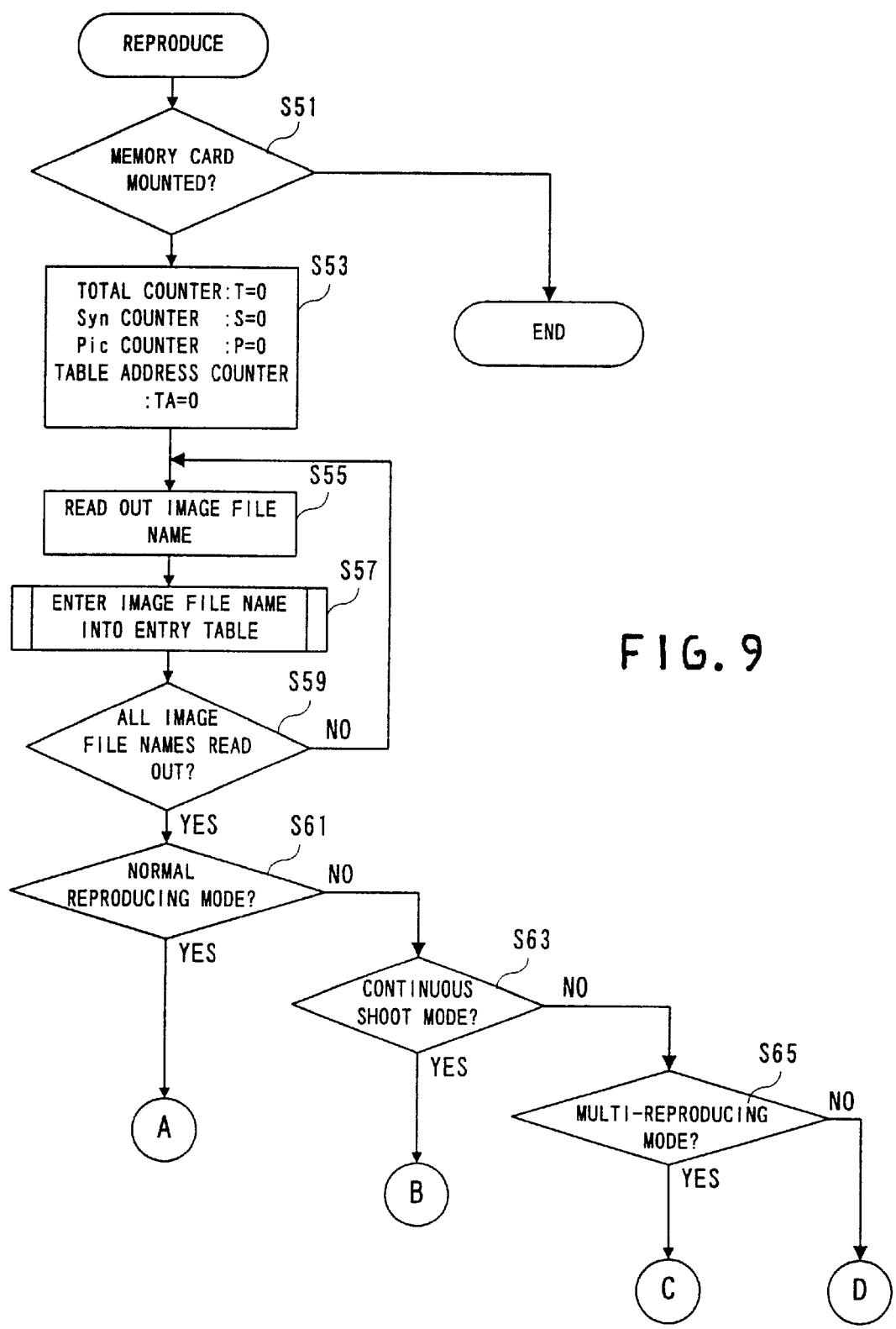
FIG. 9 is a flowchart showing one part of operations in the reproducing mode in the FIG. 1 embodiment.

Referring to FIG. 9, the CPU 28 in the reproducing mode determines at a step S51 whether the memory card 46 is inserted in a slot 44 or not. The recording medium for photographed image data and title image data is limited only to the memory card 46, the process is ended if no memory card 46 is attached to. On the other hand, if the memory card 46 is mounted, resetting is made at a step S53 for the total counter 28b, the syn counter 28c, the pic counter 28d and the table address counter 28e to read any one of the image file names out of the memory card 46 at a step S55. Then, a subroutine shown in FIG. 18 is processed at a step S57 to enter the image file name to the entry table 28f. At a step S59 it is determined whether all the image file names have been read out of the memory card 46. The CPU 28, if the determination is "NO", returns to the process to the step S55. If "YES", it is determined as to which is set of the normal reproducing mode the continuous reproducing mode, the multi-reproducing mode or the card-function reproducing mode at steps S61, S63 and S65.

Figure 10:
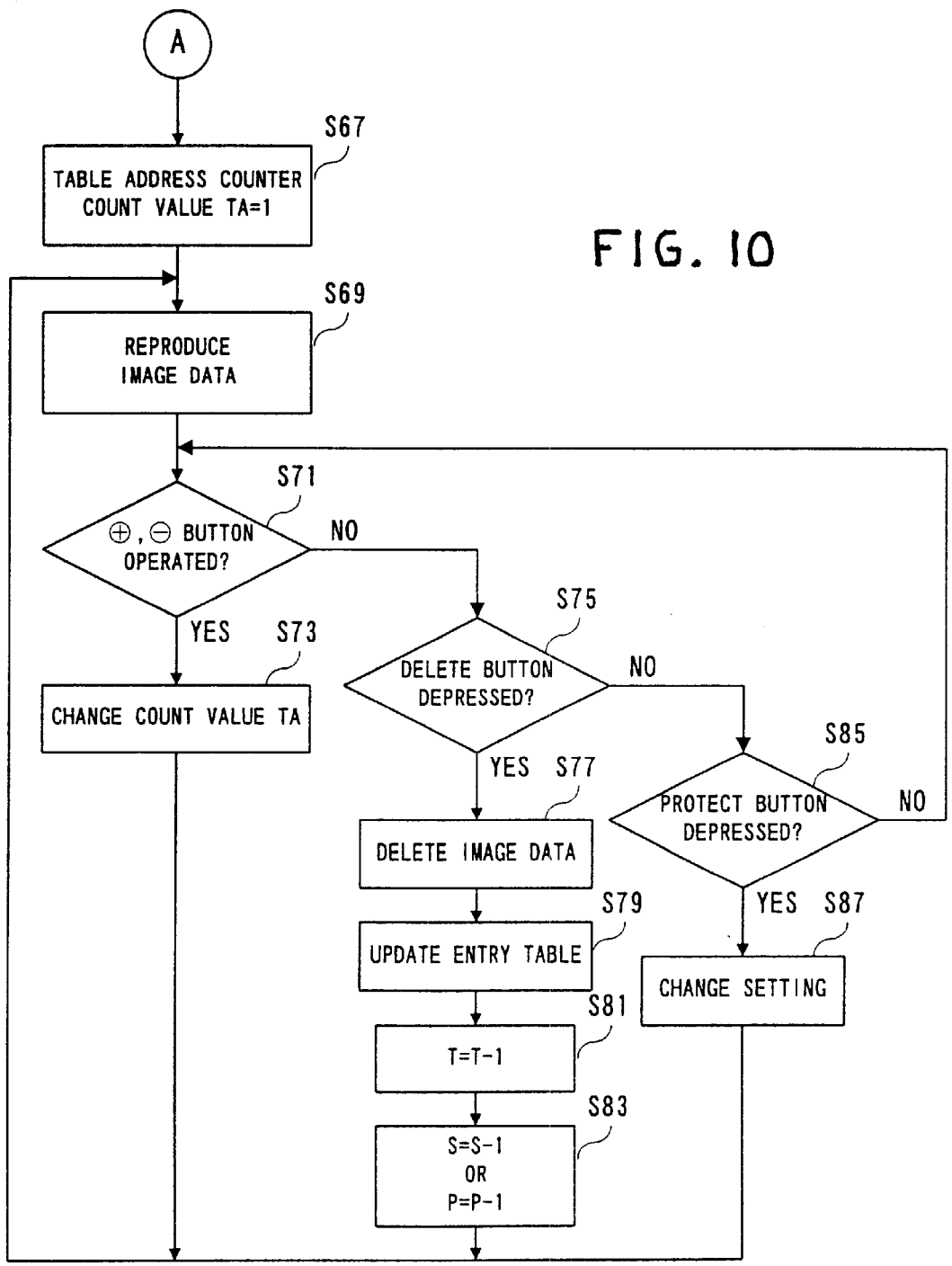
FIG. 10 is a flowchart showing another part of operations in the reproducing mode in the FIG. 1 embodiment.

If the CPU determines "YES" at a step S61, a process for the normal reproducing mode is performed according to a flowchart shown in FIG. 10. That is, the CPU 28 sets the count value TA of the table address counter 28e to "1" at a step S67, and fetches image data from an image file corresponding to the count value TA of the entry table 28f at a step S69, for reproducing the data. That is, the compressed image data is expanded according to the JPEG format, and the expanded data is outputted on the LCD 34. The CPU 28 then determines at a step S71 whether the +button 464 or −button 66 is manipulated or not. If "YES", the count value TA is incremented or decremented at a step S73 depending upon the button operation, and the process returns to a step S69. Accordingly, the reproduced image is changed over responsive to the button operation. Meanwhile, if "NO" at the step S71, the CPU 28 determines at a step S75 whether a delete button 54 is depressed or not.

If the delete button 54 is depressed, the CPU 28 deletes, at a step S77, an image file of the image data now being displayed, and updates the entry table 28f in accordance therewith at a step S79. The CPU 28 then decrements the total counter 28b at a step S81, and decrement the syn counter 28c or the pic counter 28d at a step S83. Then the process returns to the step S69. Incidentally, at the step S83, where the deleted image file is a title image file, the syn counter 28c is decremented, whereas if the deleted file is a photographed image file, the pic counter 28d is decremented.

If the determination at the step S75 is "NO", the CPU 28 at a step S85 determines whether a protection setting button 56 is depressed or not. If "NO", the process returns to the step S71, while if "YES", the protection setting is changed at a step S87 and the process returns to the step S69. That is, at the step S87, if the initial setting is on the presence of a protection, the protection is cancelled, while if the initial setting is on the absence of a protection, a protection is applied.

Figure 11:
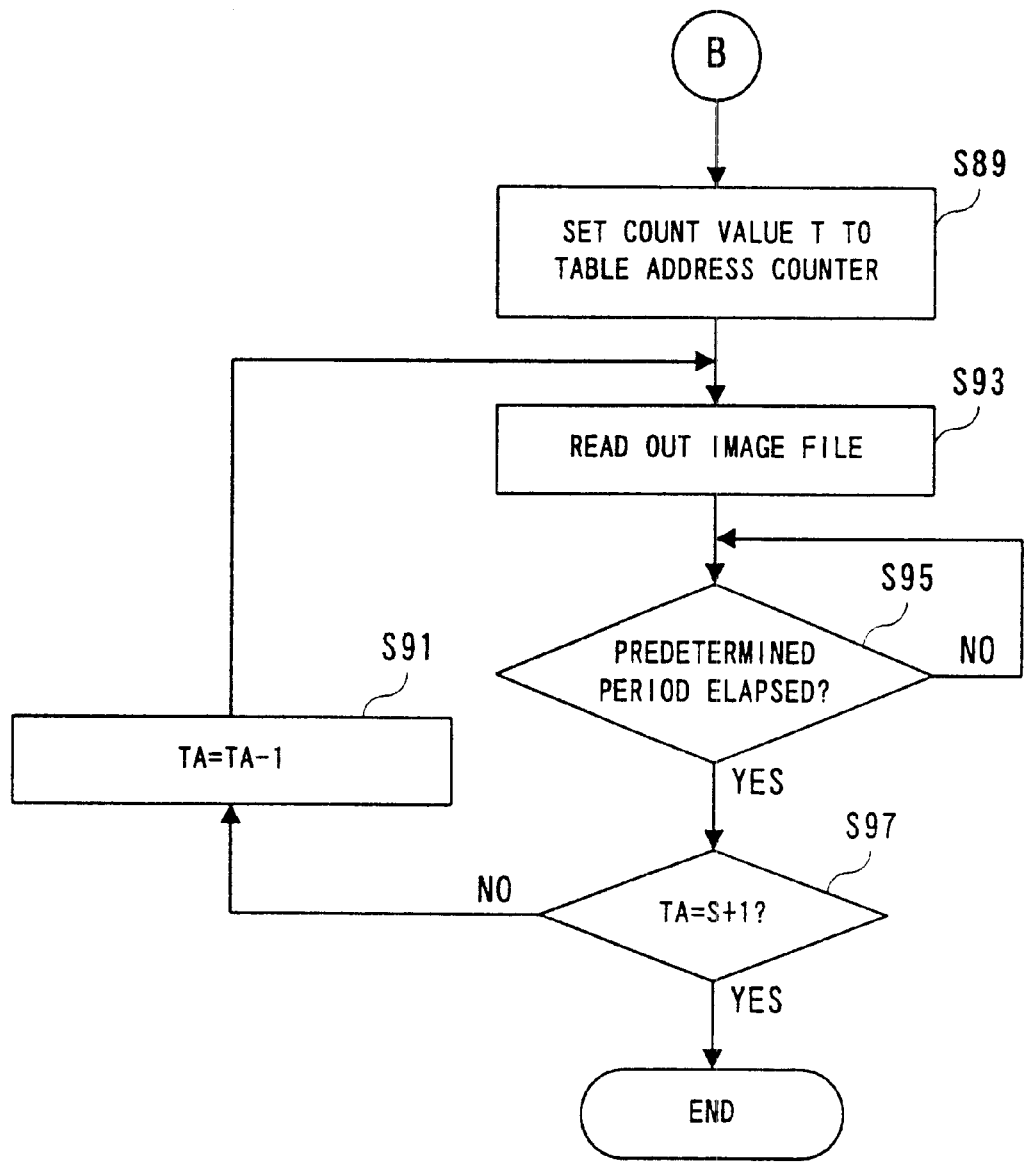
FIG. 11 is a flowchart showing another part of operations in the reproducing mode in the FIG. 1 embodiment.

If the CPU 28 determines as "YES" at a step S63 in FIG. 9, the CPU 28 considers the current mode as the continuous reproducing mode, and performs a process of the flowchart shown in FIG. 11. That is, the CPU 28 first sets the count value T of the total counter 28b to the table address counter 28e at a step S89, and reads out an image file corresponding to the count value TA of the table address counter 28e at a step S93 to output the image data on the LCD 34. After waiting for elapsing a predetermined time period at a step S95, it is determined at a step S97 whether the count value TA coincides with a count value S+1 or not. If "NO", the count value TA is decremented at a step S91 and the process returns to a step S93. While if "YES", the process is ended. Accordingly, the count value TA is decremented from "T" to "S+1". In the continuous reproducing mode, only the photographed image data recorded in the memory card 46 is reproduced at a predetermined interval in the order of recency of the data. That is, there is no possibility in the continuous reproducing mode that the title image data be reproduced.

Figure 12:
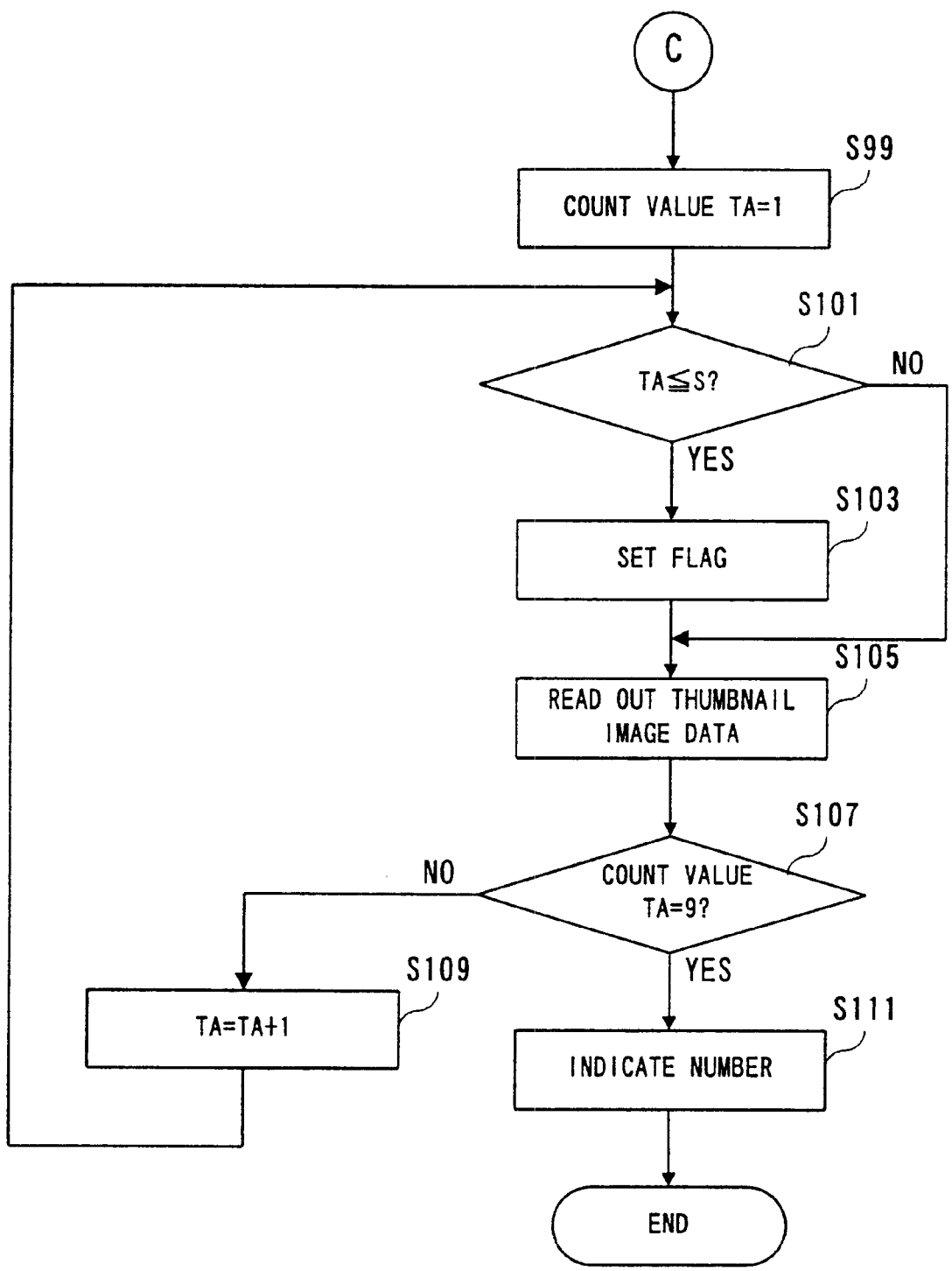
FIG. 12 is a flowchart showing still another part of operations in the reproducing mode in the FIG. 1 embodiment.

If the CPU 28 determines "YES" at a step S65, the CPU 28 considers the current mode as the multi-reproducing mode to make processing on a flowchart shown in FIG. 12. That is, the CPU 28 first sets the count value TA of the table address counter 28e to "1" at a step S99, and then determines at a step S101 the count value TA is lower than a count value S of the syn counter 28c or not. If the determination here is "YES", the image file corresponding to the count value TA is considered as a title image file to set any one of flags 68a–68i. That is, the flags corresponds respectively to the image files to be multi-reproduced, wherein the number of flags is "9" that is a maximum number to be multi-reproduced. The CPU 28 sets the flag in order to change the color of a number affixed to the title image to be reproduced.

Meanwhile, if the count value TA>the count value S stands at the step S101, the image file corresponding to the count value TA is considered as a photographed image file and the process proceeds to a step S105 without passing through a step S103. The CPU 28 reads thumbnail image data out of the image file corresponding to the count value TA at the step S105, and outputs the data on the LCD 34. The CPU 28 then determines at a step S107 whether the count value TA="9" or not. If "NO", the count value TA is incremented at a step S109, and process returns to the step S101. However, if "YES", it is considered that nine thumbnail images were multi-reproduced to indicate the number of a predetermined color depending upon the flag 68a–68i, ending the process. This makes it possible to easily discriminate between a title image and a photographed image by the color of the number.

Figure 13:
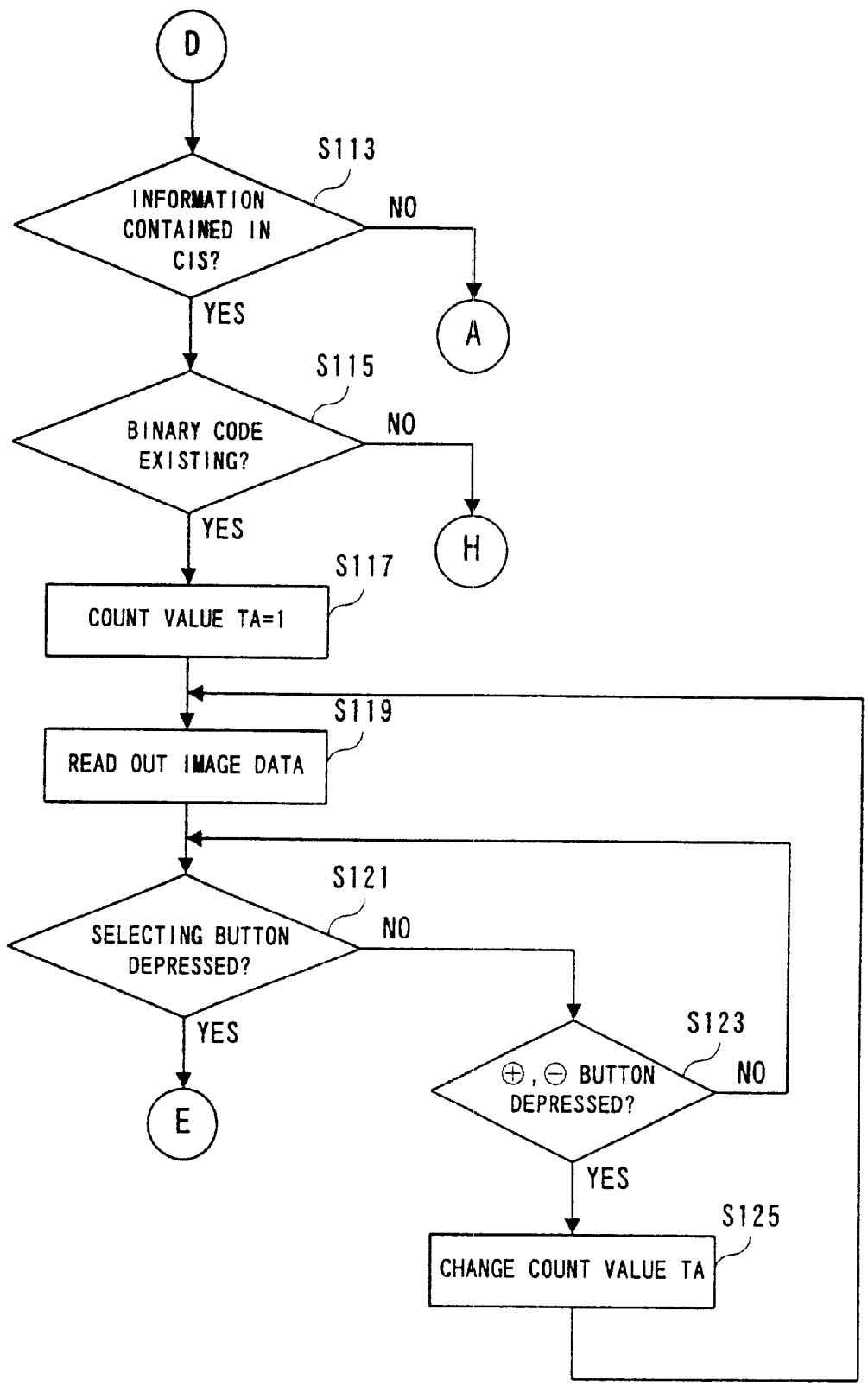
FIG. 13 is a flowchart showing further part of operations in the reproducing mode in the FIG. 1 embodiment.
Figure 14:
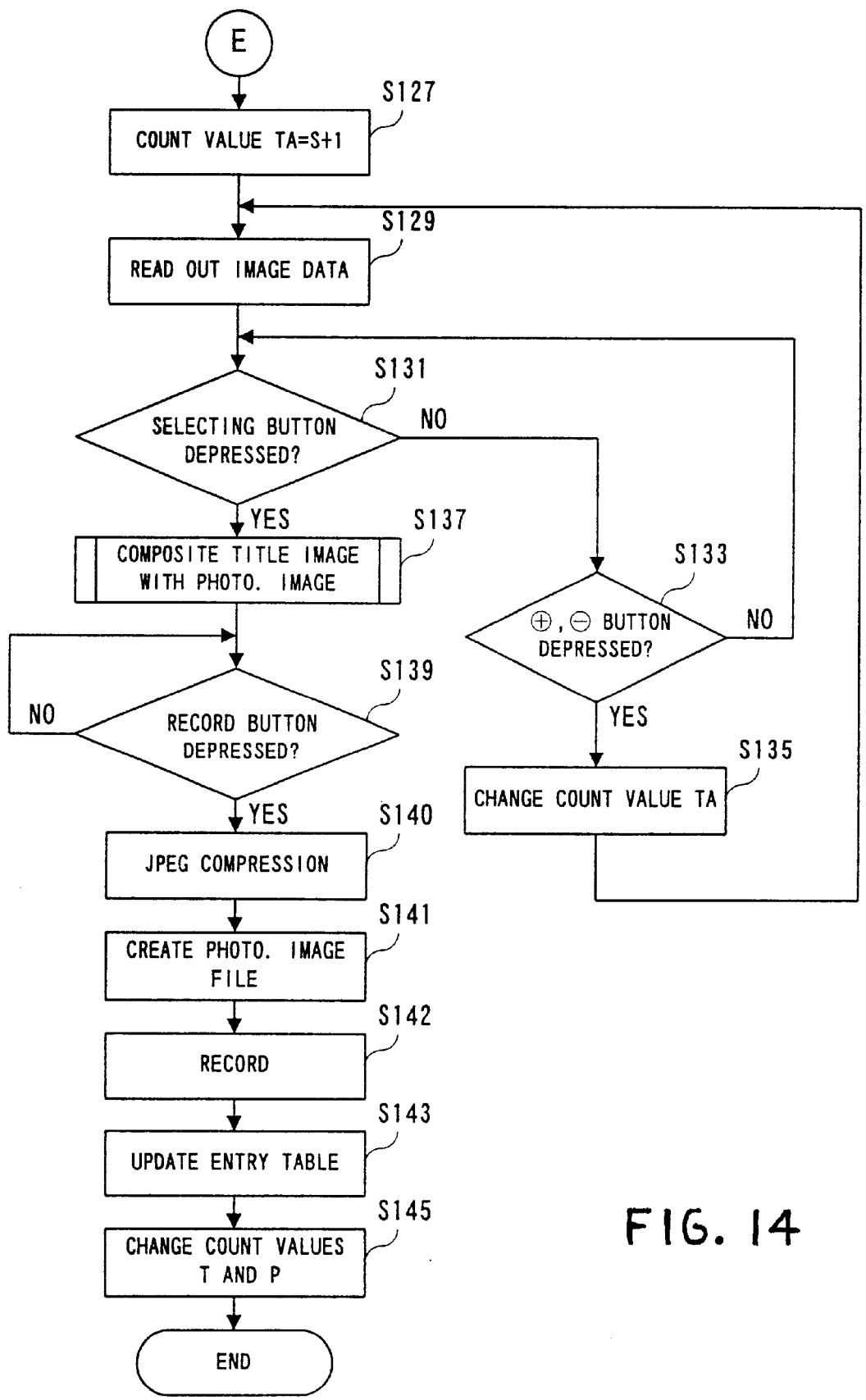
FIG. 14 is a flowchart showing another part of operations in the reproducing mode in the FIG. 1 embodiment.
Figure 15:
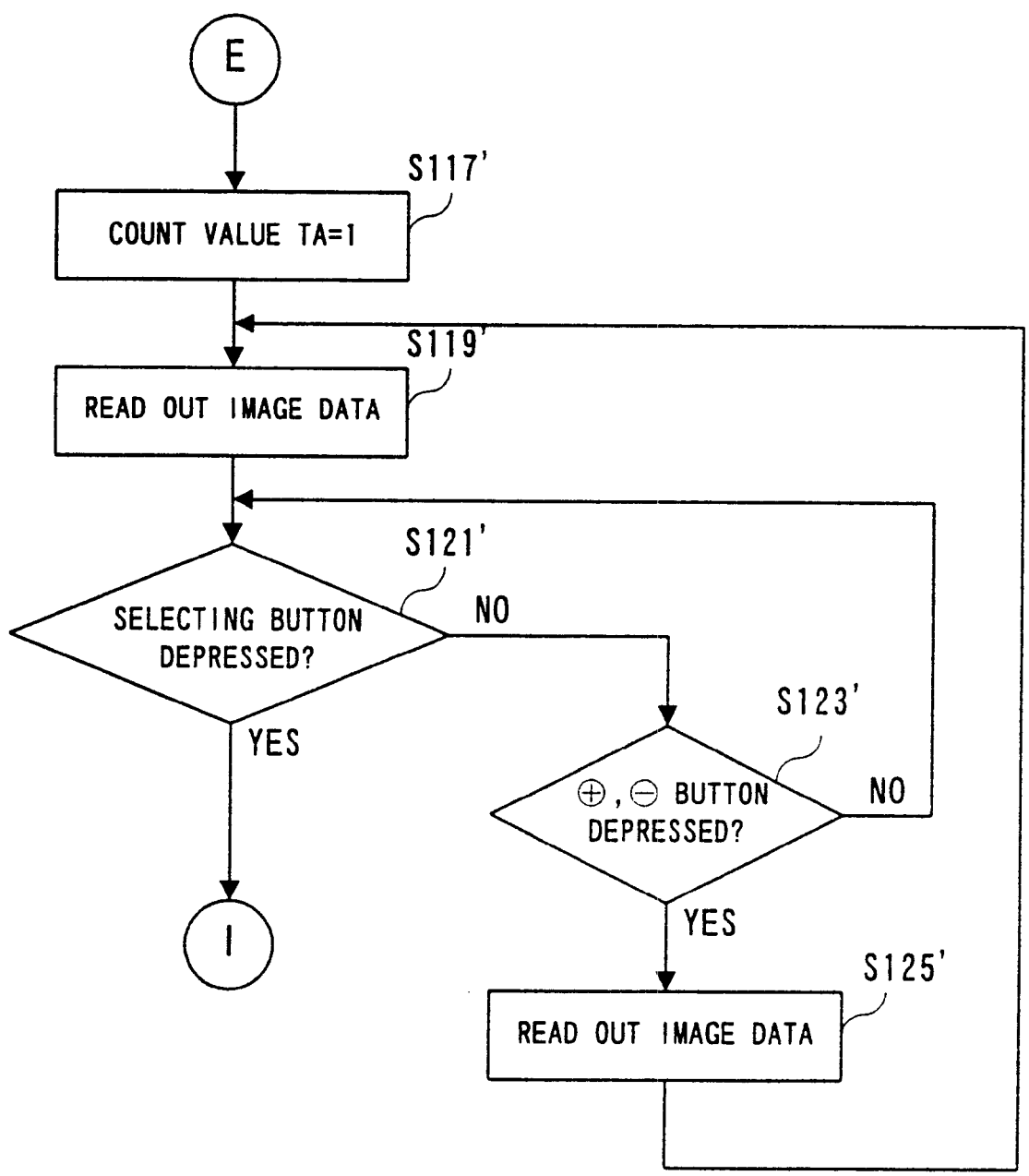
FIG. 15 is a flowchart showing another part of operations in the reproducing mode in the FIG. 1 embodiment.

If "NO" at a step S65, the CPU 28 considers that a card-function reproducing mode has been set, and makes processing on flowcharts shown in FIG. 13 and FIG. 14. That is, the CPU first determines at a step S113 whether any information is contained in the item-name information area of CIS or not. If the determination here is "NO", the CPU 28 determines that the memory card 46 is not any of a binary card and a template card. The process then advances to the step S67 to forcibly perform a process for a normal reproducing mode. That is, it is impossible for an operator to set a card-function reproducing mode. Meanwhile, if "YES" at the step S113, the CPU 28 determines at a step S115 whether there is a binary code in the item-name information area or not. If the determination here is "YES", the memory card 46 is considered as a binary card, and the process proceeds to a step S117.

The CPU 28 sets the count value TA to "1" at the step S117, and reads image data out of an image file corresponding to the count value TA at a step S119 to store the data into the memory area 24a of the DRAM 24, outputting the data through the LCD 34. The entry table 28f has image file names registered in the order as shown in FIG. 19(G) so that a title image is first displayed on the LCD 34. The CPU 28 then determines at a step S121 whether the selecting button 58 is depressed or not. If "YES", the process proceeds to a step S127, while if "NO", it is determined at a step S123 whether or not the +button 464 or the –button 66 is depressed. If "NO", the CPU returns the process to the step S121, while if "YES", the CPU changes the count value TA in response to the button operation at a step S125, returning the process to the step S119. Accordingly, the tile image displayed on the LCD 34 is changed over depending upon the operation of the+button 464 and the –button 66.

If the process advances to a step S127, the CPU 28 sets the count value TA to "S+1", and reads photographed image data from an image file corresponding to the count value TA at a step S129 to store the data into the memory area 24b of the DRAM 24. Therefore, the photographed image data is outputted on the LCD 34. The CPU 28 then determines at a step S131 whether the selecting button 58 is depressed or not, and determines at a step S133 whether the+button 464 or the –button 66 is depressed or not. If the determination at the step S133 is "YES", CPU changes at a step S135 the count value TA, returning the process to the step S129. This changes over the photographed image displayed on the LCD 34.

If the operator depresses the selecting button 58, the CPU 28 determines "YES" at the step S131. Then the process at a step S137 jumps to a subroutine shown in FIG. 20 to combine the title image data held in the memory area 24a with the photographed image data held in the memory area 24b.

Figure 20:
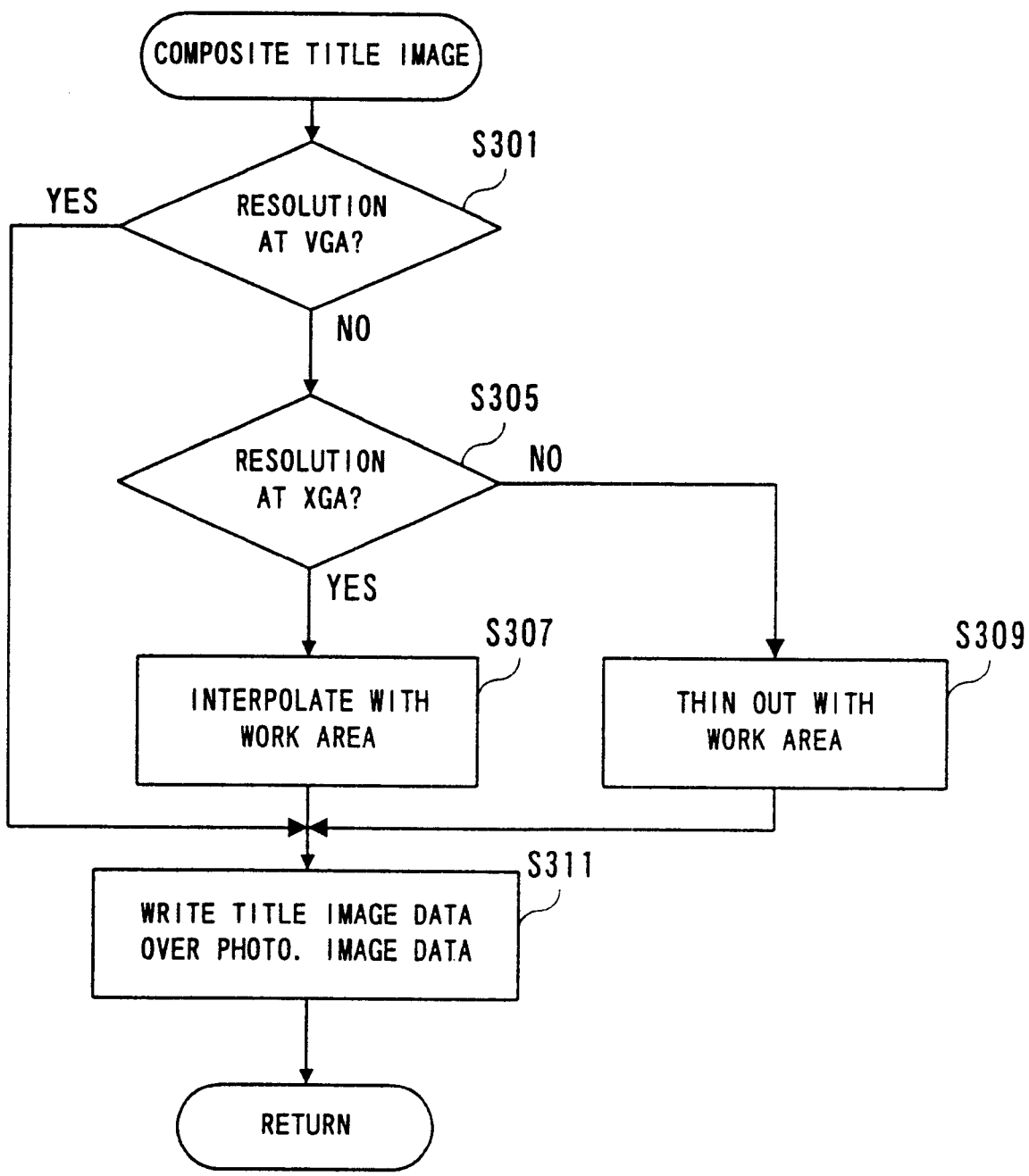
FIG. 20 is an illustrative view showing one part of operations in the FIG. 14 embodiment.

Explaining in detail with reference to FIG. 20, the CPU 28 discriminates the resolution of the photographed image data at steps S301 and S305. If resolution is at VGA, the CPU 28 determines "YES" at the step S301, and writes the title image data held in the memory area 24a, as it is, over the memory area 24b at a step S311. On the other hand, if the resolution of the photographed image is at XGA, the CPU at a step S305 determines "YES", and performs interpolation on the title image data by using the working area 24c at a step S307 to thereby adjust the resolution of the title image data to XGA. The interpolated title image data is thereafter written over the memory area 24b at the step S311. On the other hand, if the resolution of the photographed image is at QVGA, the CPU determines "NO" at a step S305, and performs thinning-out on the title image data by using the working area 24c at a step S309 to control the resolution to QVGA. The thinned-out title image data is written over the memory area 24b at the step S311. In this manner, the photographed image data and the title image data are composited with each other. The CPU then returns the process to the step S137.

Accordingly, if this digital camera 10 is of a model that can set the resolution at XGA or VGA, there is no necessity of interpolation or thinning-out provided that the photographed image data is available at VGA. Also, even where this digital camera 10 is of a model capable of setting the resolution at VGA or QVGA, interpolation or thinning-out is unnecessary provided that VGA photographed image data can be created. That is, since the resolution of the title image data lies at an intermediate between XGA and QVGA, it is possible to employ a common binary card even for a different model. Incidentally, the flowchart shown in FIG. 20 can be applied to a model that can set the resolution of a photographed image to XGA or VGA. There is a necessity for a model that can set the resolution of a photographed image at VGA or QVGA to determine whether its resolution is at QVGA or not at the step S305.

Incidentally, the title image data held in the memory area 24a is binary data that assumes "1" at a pixel where a title image exists and "0" at a pixel where no title image exists. That is, the area of "Congratulations!" shown in FIG. 6(A) only has a data value "1". For this reasons, predetermined color data is overwritten to an address of the memory area 24b corresponding to the address having the value "1".

If the operator thereafter depresses the record button 60, the CPU 28 determines "YES" at a step S139 of FIG. 14, to compress the synthetic image data according to the JPEG format at a step S140 and create a photographed image file (synthetic image file) accommodating the compressed data at a step S141. This synthetic image file is affixed with "pic0000P+1.jpg". The CPU 28 records the prepared image file in the memory card 46, and updates the entry table 28f at a step S143. Then, the count value T of the total counter 28b and count value P of the pic counter 28d are incremented at a step S145 to end the process.

Accordingly, where the slot 44 is mounted with a binary card and a card function reproducing mode is set, when the operator selects a title image shown in FIG. 6(A) and a photographed image shown in FIG. 6(B), a synthetic image is created as shown in FIG. 6(C). The synthetic image file having the synthetic image is recorded in the binary card.

Figure 16:
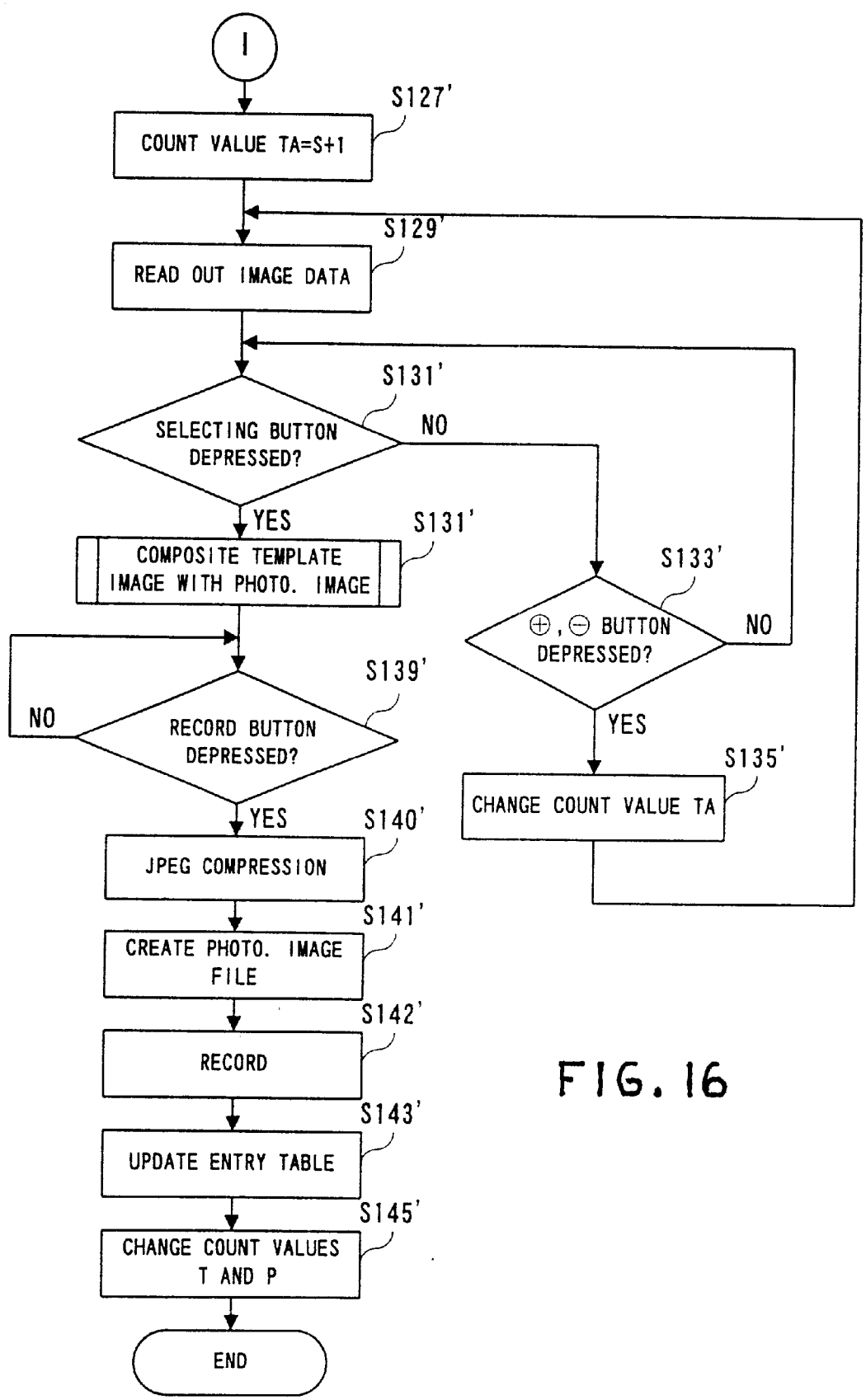
FIG. 16 is a flowchart showing another part of operations in the reproducing mode in the FIG. 1 embodiment.
Figure 21:
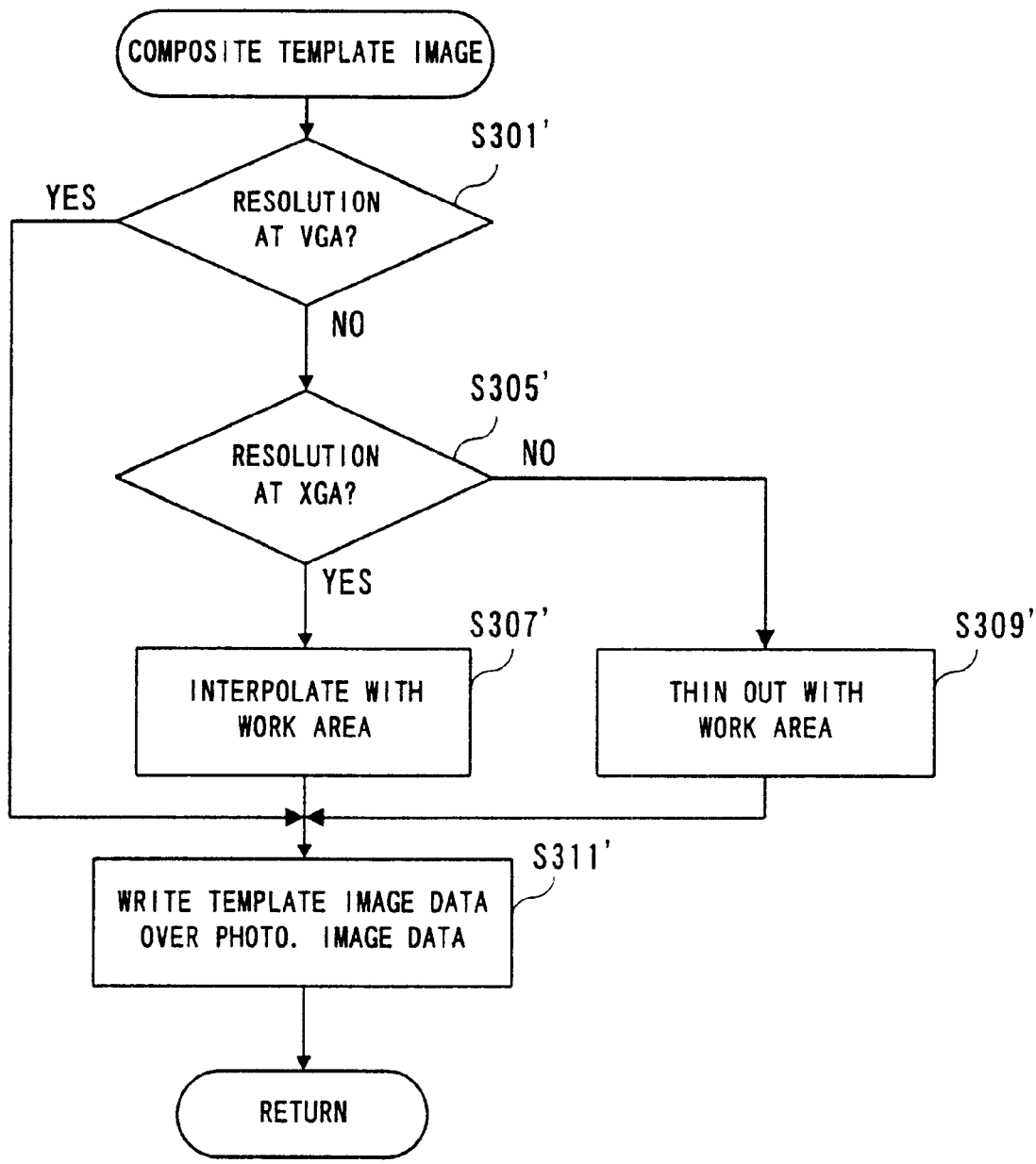
FIG. 21 is an illustrative view showing one part of operations in the FIG. 15 embodiment.

Meanwhile, if the determination at the step S115 is "NO", the CPU 28 performs processing at steps S127'–S163' shown in FIG. 11 and FIG. 16 as well as a subroutine of FIG. 21. However, these processes are almost similar to the steps S127–S163 as well as the subroutine of FIG. 20 except for compositing a template image with a photographed image at a step S137', omitting duplicated explanations. When the operator selects a template image shown in FIG. 5(A) and a photographed image shown in FIG. 5(B), a synthetic image is created as shown in FIG. 5(C). That is, the template image shown in FIG. 5(A) has no data (data value is "0") existing at areas other than the curtain so that the image of the curtain is written over the photographed image. The file accommodating this synthetic image is recorded in a template card.

Figure 17:
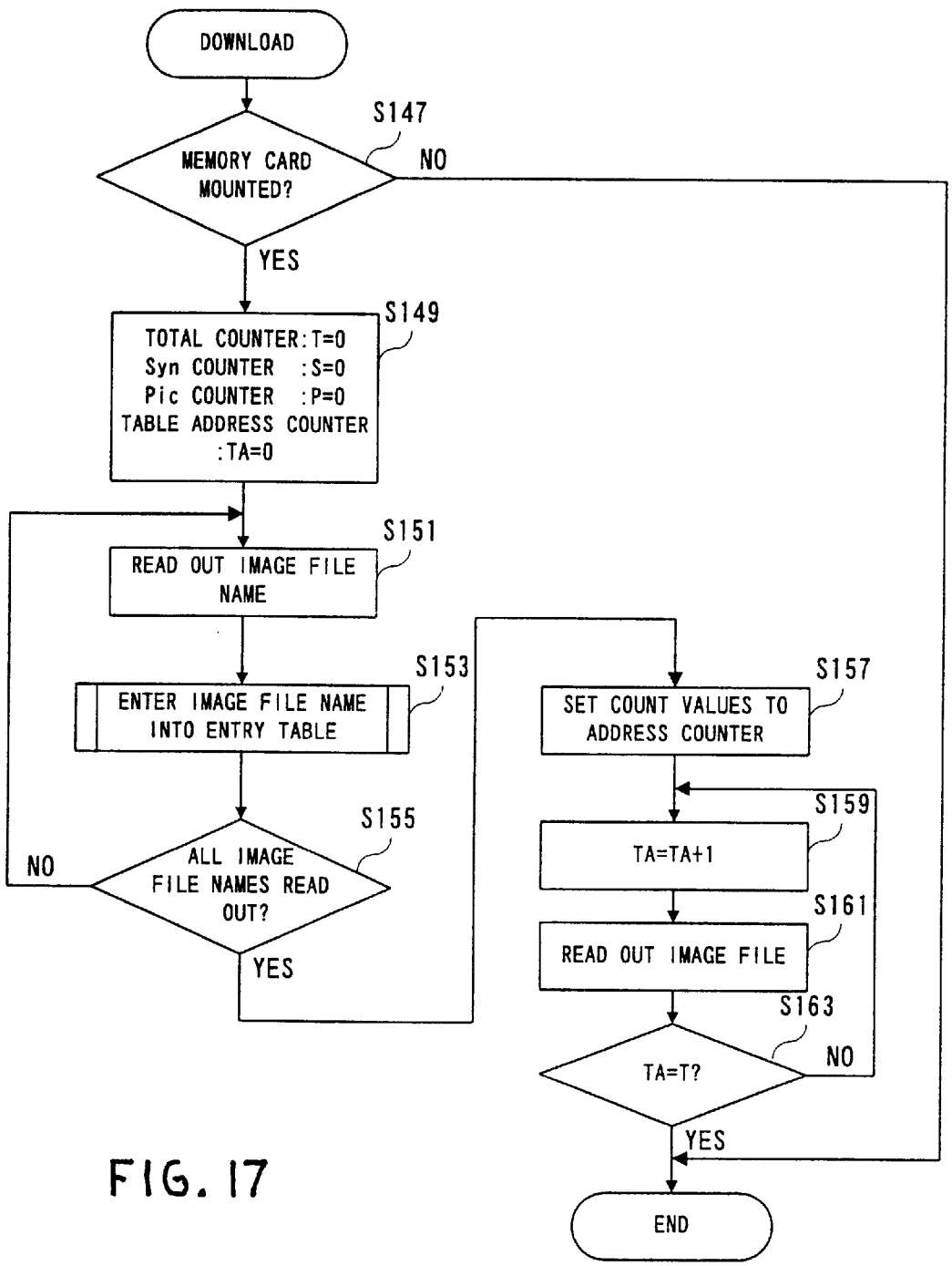
FIG. 17 is a flowchart showing operations during downloading in the FIG. 1 embodiment.

If the operator depresses a download button 62, the CPU 28 performs processing on a flowchart shown in FIG. 17. That is, the CPU first determines at a step S147 whether the memory card 46 is mounted or not. If the determination here is "NO", it is impossible to download an image file, promptly ending the process. On the other hand, if the memory card 46 is attached, the CPU 28 at a step S149 resets the total counter 28b, the syn counter 28c, the pic counter 28d and the table address counter 28e. Thereafter processes are performed at steps S151–S155 similarly to the steps of S3–S7, to register all the image file name contained in the memory card in a predetermined order to the entry table 28f.

The CPU 28 subsequently sets, at a step S157, the count value S of the syn counter 28c to the table address counter 28e, and increments the count value TA of the table address counter 28e at a step S151. Then, the CPU 28 reads out, at a step S161, an image file corresponding to the count value TA to output the data to a personal computer through the output terminal 67. In this manner, the image files are downloaded one by one. When the count value TA reaches a count value of the total counter 28b, "YES" is determined at a step S163 to end the process.

Accordingly, if the memory card 46 is a template card or binary card, only the photographed image file is downloaded onto the personal computer without reading out the template image file or title image file. Meanwhile, where the memory card 46 is an ordinary card, since the syn counter 28c has a count value S of "0" at a time that the image file names have been entered to the entry table, all the photographed image files are downloaded onto the personal computer.

According to this embodiment, the image files are all created in a same form, i.e. a form as shown in FIG. 2, and recorded in a same memory card 46, facilitating the management of the image files. Also, there is no possibility that the title image file is erroneously erased because the title image file is automatically subjected to protection. Further, since there is a difference in color between the number affixed to the title image and the number put to the photographed image, the title image and the photographed image are easy to distinguish from each other. Furthermore, even where the title image file and the photographed image file are recorded at random in the memory card 46, the entry table 28f is registered by image file names in the order of from the title image file to the photographed image file, facilitating to distinguish between the title image and the photographed image during reproduction.

Incidentally, the memory card may employ various kinds of parts involving SSFDC (Solid-State Floppy Disc Card). Also, although this embodiment utilized the complimentary-colored filter having $Y_e$, $C_y$, $M_g$ and G arranged in the mosaic form, a primary-colored filter may be employed that has R, G and B arranged in the mosaic form.

Further, this embodiment were explained on the assumption that nine or more image data are present in the multi-reproducing mode. However, if the image data is less than nine in number, the number having a predetermined color is displayed after all the recorded image data have been displayed.

Furthermore, it was explained in this embodiment that, where the photographed image and the title or template image are different in resolution, the title image data and the template image data are processed to be coincident in resolution. Alternatively to this, the photographed image may be adjusted in resolution by performing a predetermined process.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera comprising:

a photographer for photographing an object in response to a photographing instruction;

a first recorder for recording a photographed image signal outputted from said photographer into a recording medium which stores a special image signal;

a compositor for compositing the photographed image signal and the special image signal each of which is recorded on said recording medium with one another in response to an image compositing instruction;

a second recorder for recording a composite image signal created by said compositor into said recording medium; and a reproducer for reproducing the special image signal, the photographed image signal and the composite image signal from said recording medium, wherein the special image signal is assigned with a first identifier, each of the photographed image signal and the composite image signal is assigned with a second identifier, and said reproducer first reproduces the image signal(s) assigned with one of the first identifier and the second identifier, and then reproduces the image signal(s) assigned with other of the first identifier and the second identifier;

wherein said reproducer reproduces the special image signal first, and then reproduces each of the photographed image signal and the composite image signal.

* * * * *